US012359398B2

(12) United States Patent
Chowdhury et al.

(10) Patent No.: US 12,359,398 B2
(45) Date of Patent: Jul. 15, 2025

(54) AUTOMATIC STEERING OF VEHICLE

(71) Applicant: Caterpillar Inc., Peoria, IL (US)

(72) Inventors: Sagar Chowdhury, Union City, CA (US); Karl Kirsch, Chillicothe, IL (US); Matthew D. Johnson, Dunlap, IL (US); Philip C. Wallstedt, Washington, IL (US); Manish Sharma, Santa Clara, CA (US); Kevin A. Davis, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 313 days.

(21) Appl. No.: 17/804,462

(22) Filed: May 27, 2022

(65) Prior Publication Data

US 2023/0383498 A1   Nov. 30, 2023

(51) Int. Cl.
*E02F 9/20* (2006.01)
*G05D 1/00* (2024.01)

(52) U.S. Cl.
CPC ............ *E02F 9/2045* (2013.01); *E02F 9/205* (2013.01); *G05D 1/0212* (2013.01); *G05D 1/0272* (2013.01)

(58) Field of Classification Search
None
See application file for complete search history.

(56) References Cited

U.S. PATENT DOCUMENTS

| 9,157,754 | B2 | 10/2015 | Lewis et al. |
| 2007/0267916 | A1* | 11/2007 | Mackovjak ............. B60T 8/246 |
| | | | 303/146 |

| 2019/0196491 | A1 | 6/2019 | Balogh et al. |
| 2021/0080961 | A1 | 3/2021 | Shenai et al. |
| 2021/0094534 | A1* | 4/2021 | Hyun .................... B60W 10/04 |
| 2021/0294333 | A1 | 9/2021 | Jing et al. |

FOREIGN PATENT DOCUMENTS

| CN | 108622084 A | 10/2018 | |
| CN | 109250528 A | 1/2019 | |
| CN | 112172820 A | 1/2021 | |
| DE | 102016104574 A1 * | 9/2017 | ......... B62D 15/0285 |
| JP | 2671990 B2 * | 11/1997 | ............... B62D 6/00 |

(Continued)

OTHER PUBLICATIONS

Written Opinion and International Search Report for Int'l. Patent Appln. No. PCT/US2023/019332, mailed Jul. 27, 2023 (9 pgs).

*Primary Examiner* — Adam D Tissot
*Assistant Examiner* — Charles Pall (57) ABSTRACT

A method of automatically turning an autonomous mining truck (AMT), including front wheels and rear wheels, around in an operating area, including retrieving boundary data associated with the operating area, determining a first path to follow to execute a turn maneuver within the operating area based at least on the boundary data and dimensions of the AMT, wherein the first path includes a number of legs necessary to follow the first path through the turn maneuver, completing a first leg of the turn maneuver, determining a second path to follow and number of legs necessary to execute the turn maneuver based on an inability to execute the first path, and executing the second path to complete the turn maneuver.

13 Claims, 6 Drawing Sheets

(56) References Cited

FOREIGN PATENT DOCUMENTS

| JP | 2019089403 A | | 6/2019 | |
|---|---|---|---|---|
| JP | 2021132592 A | * | 9/2021 | ............. A01B 69/00 |
| KR | 101593839 B1 | * | 2/2016 | ............ B60W 30/06 |
| KR | 20180045468 A | | 5/2018 | |
| WO | 2014011173 A1 | | 1/2014 | |
| WO | WO-2022095814 A1 | * | 5/2022 | ......... B62D 15/0285 |

* cited by examiner

AUTOMATIC STEERING OF VEHICLE

TECHNICAL FIELD

The present disclosure relates generally to automatic steering of vehicles, and more particularly, to automatic steering of autonomous haul vehicles.

BACKGROUND

Systems for independently articulating wheels of autonomous vehicles to minimize a steering radius may have been disclosed. For example, publications have described maneuvering a large self-driving vehicle by adjusting multiple wheels or wheel sets independently of one another, for instance to achieve a minimum turning radius or otherwise modify driving operations to avoid nearby objects. U.S. Patent Application Publication No. 20210080961 to Shenai ("Shenai"), describes systems for articulating wheels of autonomous vehicles to minimize a steering radius. However, Shenai fails to address some of the more complex turn scenarios of a vehicle.

The systems and process of the present disclosure may solve one or more of the problems set forth above and/or other problems in the art. The scope of the current disclosure, however, is defined by the attached claims, and not by the ability to solve any specific problem.

SUMMARY

In one aspect, a method of automatically turning an autonomous mining truck (AMT), including front wheels and rear wheels, around in an operating area includes: retrieving boundary data associated with the operating area, determining a first path to follow to execute a turn maneuver within the operating area based at least on the boundary data and dimensions of the AMT, wherein the first path includes a number of legs necessary to follow the first path through the turn maneuver, completing a first leg of the turn maneuver, determining a second path to follow and number of legs necessary to execute the turn maneuver based on an inability to execute the first path, and executing the second path to complete the turn maneuver.

In another aspect, a method of preparing to execute a task within an operating area using an autonomous mining truck (AMT), including front wheels and rear wheels, comprising: retrieving boundary data associated with an operating area, determining a path to follow to execute a turn maneuver within the operating area based at least on the boundary data and dimensions of the AMT, wherein the path includes a number of legs necessary to follow the path through the turn maneuver, completing a leg of the turn maneuver, determining that a requested wheel position is unable to be achieved, moving in one or more of a forward direction and a reverse direction to assist in reaching the requested wheel position, initiating a subsequent leg of the turn maneuver based on achieving the requested wheel position.

In yet another aspect, a system for automatically turning an autonomous mining truck (AMT) around in an operating area, includes one or more front wheels; one or more rear wheels; a controller, including machine readable instructions, that when executed by the controller cause the AMT to: retrieve boundary data associated with the operating area; determine a first path to follow to execute a turn maneuver within the operating area based at least on the boundary data and dimensions of the AMT, wherein the first path includes a number of legs necessary to follow the first path through the turn maneuver; complete a first leg of the turn maneuver; determine a second path to follow and number of legs necessary to execute the turn maneuver based on an inability to execute the first path; and execute the second path to complete the turn maneuver.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Automated mining trucks (AMT) may be mobilized at a work site to complete one or more tasks. The AMTs may have plans and/or paths programmed into their memory which may be executable in a given number of steps or turns, which may include one or more segments (or "legs"). These plans/paths may be based on particular assumptions associated with the work site and/or the AMT. For example, surface traction may be assumed at a particular value for a given work truck and plans may be generated based on these assumptions. For example, a plan for a turn within an operating area of the work site may include "n" number of turn legs based on the assumed turn radius of the vehicle given a set of assumptions about the vehicle, the operating environment, and other factors. If however, these assumptions are not substantially accurate for a given work site or portion thereof (i.e., where the AMT will work) the plans and/or paths programmed into the memory of the AMT may not be achievable in the planned number of steps for any particular plan or path of the AMT. For example, if surface friction is too great for an AMT to achieve a necessary turning radius for a given path, the AMT may not be able to follow the planned path without taking one or more supplemental actions or making additional turns. The systems and processes described herein assist an AMT in reaching a particular location at a required orientation at a work site.

Figure 1:
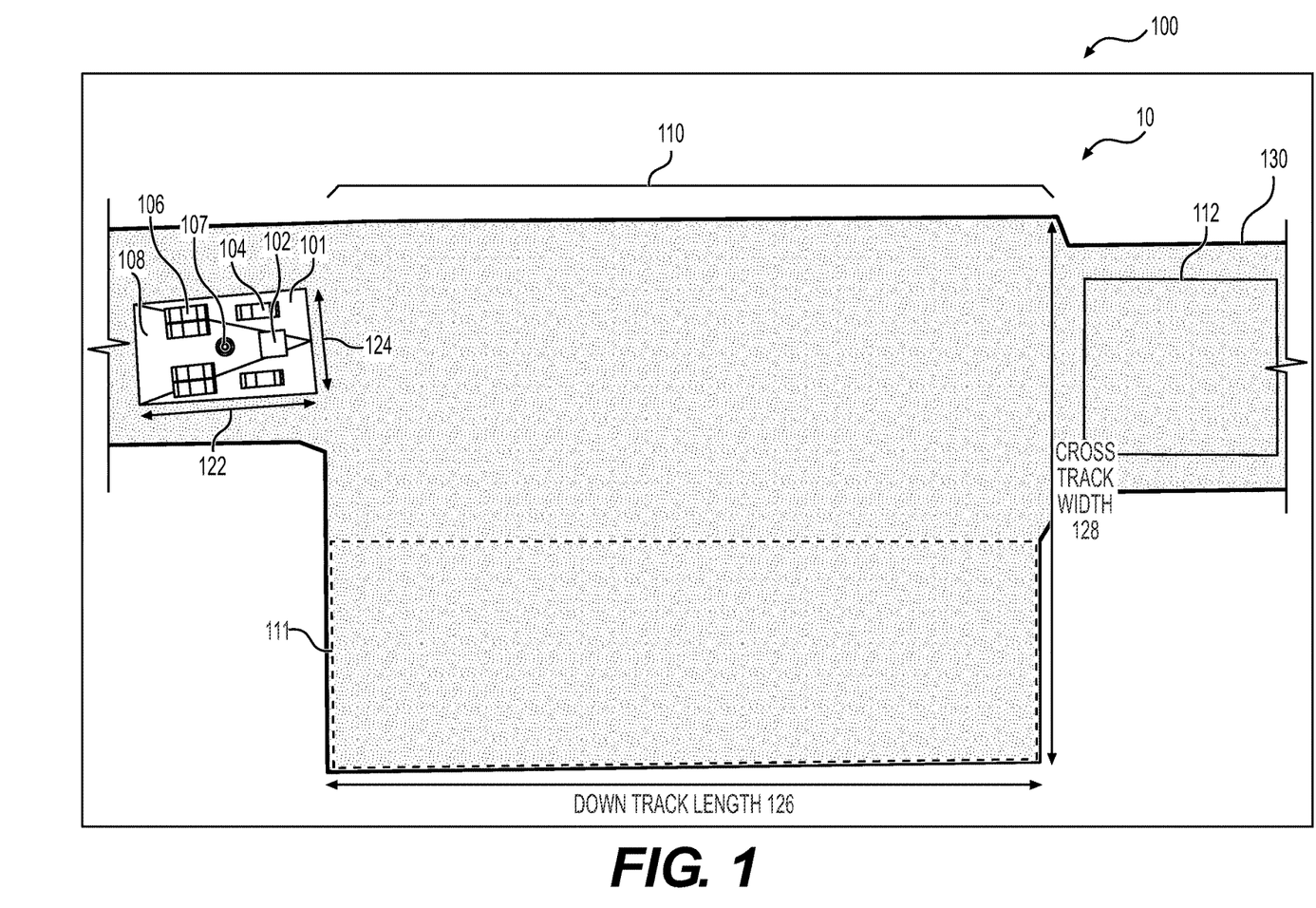
FIG. 1 is a top view of a system and scenario for automatically steering an autonomous mining truck (AMT), according to aspects of the disclosure.

FIG. 1 illustrates a system 100 for automatically steering an autonomous haul vehicle such as an autonomous mining truck (AMT) 101 (also referred to herein as "the vehicle" or "vehicle") through a job location 10, which may be a portion of a work site (e.g., a mine). The illustrated embodiment depicts an autonomous mining truck, but the systems and processes described herein could be embodied on any number of vehicles, which vehicles may have various levels of autonomy (e.g., autonomy levels 1-5), including, without limitation, a mining vehicle, a bulldozer, a motor grader, etc. The AMT 101 may include a controller 102 that is generally capable of automatically steering and/or braking the front wheels 104 and the rear wheels 106 of the AMT 101 to drive the AMT 101 at the job location 10. The AMT 101 may include one or more sensors 107 for determining its position, which may serve as inputs to the controller 102, as described in greater detail herein. The sensors 107 may include, for example, one or more GPS systems and one or more inertial measurement units (IMU). The AMT 101 may also include a bed 108 (depicted schematically as triangle) for hauling an extracted constituent (e.g., minerals or other geological materials). The AMT 101 may include one or more brakes or brake systems for stopping the AMT 101 as it moves about the job location 10. For example, the AMT 101 may include front brakes (not shown) for stopping the front wheels 104 and rear brakes (not shown) for stopping the rear wheels 106. In some embodiments, the AMT 101 may include a secondary brake system (not depicted) for assisting the front brakes and the rear brakes (e.g., a waiting brake system, parking brake system, retarder control, service brake, etc.). In some embodiments, the secondary brake system status may serve as an input to one or more other systems as described in greater detail herein.

The AMT 101 may be configured, via the controller 102 and other systems, to turn around within an operating area 110 (which may include a cusp 111) such that the bed 108 of the AMT 101 can be reversed into a target area 112 and loaded with constituents. The cusp 111 may be an area into which the AMT 101 can drive such that it has more room to turn around within the operating area 110; the AMT 101 may, for example, reach an end of its planned path before to a target area 112 and may use the cusp 111 to turn around to reverse into the target area 112. The target area 112 may be, for example, a staging area for loading or unloading one or more minerals, geological materials, or other constituent onto, into, or out of the vehicle. In order to maneuver within the operating area 110, the system 100 may plan and cause the AMT 101 to automatically carry out one or more turn maneuvers within the operating area 110. The turn maneuvers may include one or more legs or segments and may require a two-leg, four-leg, six-leg, eight-leg, etc. turn as will be described in greater detail herein. As used herein, leg refers to that portion of a turn maneuver which portion is in-between the multiple stopping points of the vehicle during a multi-point turn maneuver as the vehicle changes its direction (that is, from forward to reverse) within an operating area. For example, with reference to FIG. 1, the AMT 101 may turn its orientation substantially 180-degrees so that it faces the opposite direction as it aligns itself into the operating area 110. In some parlance, turn maneuvers which enable vehicles to conduct this type of turn may be referred to as a three-point turn, a five-point turn, an n-point turn, etc.

Still referring to FIG. 1, the AMT 101 has several characteristics, such as a vehicle length 122, a vehicle width 124, and a minimum turn radius (not depicted) which may be determined based on the physical characteristics of the AMT and/or the road characteristics. For example, the minimum turn radius may depend on the vehicle length 122, the vehicle width 124, the maximum degree of turn of one or more of the front wheels 104 and/or the rear wheels 106, the grip and profile of tires on the front wheels 104 and the rear wheels 106, and other aspects of the AMT 101. The minimum turn radius also depends on external factors, for example, the surface characteristics of the road, dirt, gravel, or other surface of the job location 10. These characteristics may be stored on the AMT 101 (e.g., in one or more modules of the controller 102) so that the AMT 101 can use the values to calculate turn maneuvers as described herein.

As shown in FIG. 1, the job location 10 has one or more characteristics such as a length and a width, which characteristics may be expressed with respect to the AMT 101 as a down track dimension or length 126 and a cross track dimension or width 128. The job location 10 may be mapped, graphed, or otherwise digitally represented in a program for automatically steering the AMT 101, and in the program a user may assign or generate one or more lane polygons to the job location 10 to represent features associated with the job location 10, the AMT 101, or both. As used herein, the term "lane polygons" refers to digital boundaries generated based on physical characteristics of the job location which serve as the lane boundaries within the route planning modules of the AMT 101. In some embodiments, the entire work site or just one or more job locations similar to the job location 10 may be mapped, graphed, or otherwise digitally represented. For example, the location and features of the operating area 110 and the target area 112 may be mapped in the program to enable the AMT 101 to automatically maneuver within the job location 10. Some embodiments of the system 100 may include an input/output device (e.g., a computer with a keyboard and monitor, a touchscreen device, a personal mobile device, etc.) that is capable of executing the program to develop one or more templates including one or more boundaries that may serve as geographic coordinates or position lines for controlling aspects of the automatic movement of the AMT 101. For example, FIG. 1 shows a boundary line 130 that may be mapped into the system 100 for automatically maneuvering the AMT 101. Boundary lines (which are not all depicted) such as the boundary line 130 may be used to define and distinguish areas of the job location 10 such as the operating area 110, the cusp 111, the target area 112, and other regions of the work site such as traffic lanes, etc.

Some embodiments of the system 100 include a program capable of receiving, storing, and manipulating data associated with an elevation or gradient of the job location 10 and one or more sensors on the AMT 101 may be capable of detecting one or more of a pitch, roll, and yaw of the AMT 101 as it travels around the job location 10. The detected pitch, roll, and yaw of the AMT 101 may be compared with an elevation plan of the job location 10 or otherwise used to affect one or more aspects of the AMT 101 as it moves about the job location 10. For example, the AMT 101 may be configured to engage/disengage brakes based on its own pitch and/or a work site gradient as described in greater detail herein.

Figure 2:
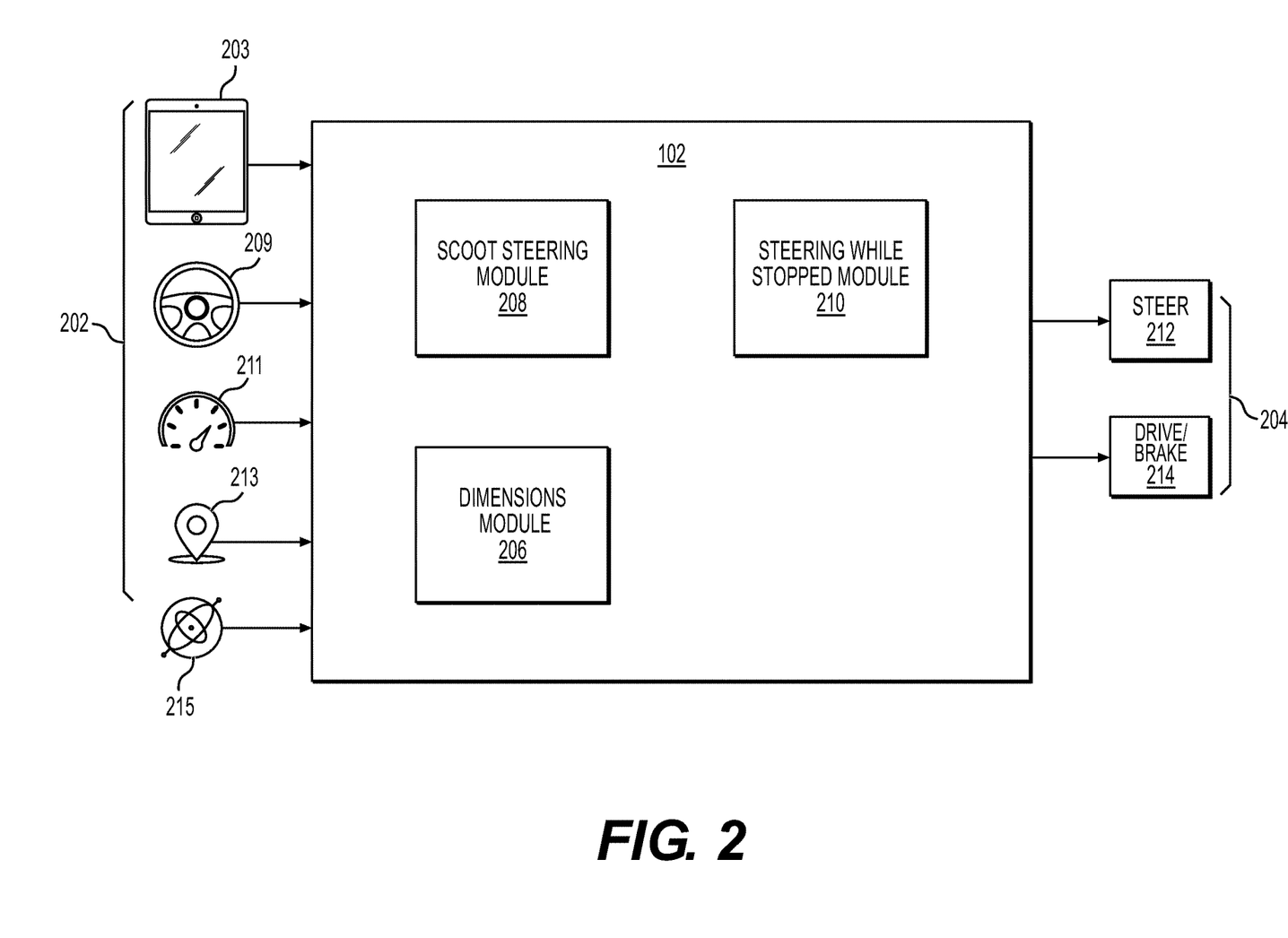
FIG. 2 is a controller for automatically steering the AMT of FIG. 1.

Referring now to FIG. 2, the controller 102 is shown in greater detail. The controller 102 includes inputs 202 and outputs 204. The controller 102 may comprise a data processor, a microcontroller, a microprocessor, a digital signal processor, a logic circuit, a programmable logic array, or one or more other devices for controlling the system 100 in response to one or more of the inputs 202. Controller 102 may embody a single microprocessor or multiple microprocessors that may include means for automatically steering the AMT 101. For example, the controller 102 may include a memory, a secondary storage device, and a processor, such as a central processing unit or any other means for accomplishing a task consistent with the present disclosure, which task may be embodied in one or more machine readable instructions (e.g., software code). The memory or secondary storage device associated with controller 102 may store data and/or software routines that may assist the controller 102 in performing its functions, such as the functions of the exemplary control process 300 described with respect to FIG. 3. Further, the memory or secondary storage device associated with the controller 102 may also store data received from various inputs associated with the system 100. Numerous commercially available microprocessors can be configured to perform the functions of the controller 102. It should be appreciated that controller 102 could readily embody a general machine controller capable of controlling numerous other machine functions. Alternatively, a special-purpose machine controller could be provided. Further, the controller 102, or portions thereof, may be located remote from the AMT 101. Various other known circuits may be associated with the controller 102, including signal-conditioning circuitry, communication circuitry, hydraulic or other actuation circuitry, and other appropriate circuitry.

The inputs 202 may include an input/output device 203 (e.g., a touchscreen device, a computer, etc.), a dimensions module 206 which may receive an input from the input/output device 203, a scoot steering module 208 which may receive a signal from a steering angle sensor 209, and a steering while stopped module 210, which may receive an input from a speed sensor 211. The outputs 204 may include a steering command 212 and a drive/brake command 214. The controller 102 and the various modules may also receive an input from a GPS 213 and/or an IMU 215.

The GPS 213 may be positioned on the AMT 101 and may be configured to determine a location of the AMT 101, which it may embody as GPS data, as described herein. The GPS 213 may be configured to receive one or more signals from a global navigation satellite system (GNSS) (e.g., GPS system) to localize the AMT 101 via geolocation. In some embodiments, the GPS 213 may provide an input to or be configured to interact with, update, or otherwise utilize one or more digital maps, such as an HD map (e.g., in a vector layer, in a raster layer or other semantic map, etc.). In some embodiments, the GPS 213 may be configured to receive updates from an external network.

The IMU 215 may be an electronic device that measures and reports one or more features regarding the motion of the AMT 101. For example, the IMU 215 may measure a velocity, acceleration, angular rate, and or an orientation of the AMT 101 or one or more of its individual components using a combination of accelerometers, gyroscopes, and/or magnetometers. The IMU 215 may detect linear acceleration using one or more accelerometers and rotational rate using one or more gyroscopes. In some embodiments, the IMU 215 may be communicatively coupled to the GPS 213 and may provide an input to and receive an output from the GPS 213, which may allow the GPS 213 to continue to predict a location of the amt 101 even when the GPS 213 cannot receive satellite signals.

The dimensions module 206 may store data associated with the dimensions of the AMT 101 (e.g., one or more of the vehicle width, vehicle length, and minimum turn radius), work site details including, for example, lane polygons, feature geographies, lane boundaries, lane centerlines, junctions, edge segments, one or more ratio limits (i.e., limits of the turning capability of the AMT 101 with respect to the characteristics of a particular work site and its own characteristics), and other features of the work site, the AMT 101, and objects/features in the environment. The dimensions module 206 may store this information in a back office or otherwise offsite from the job location 10 and it may be transmitted to the AMT 101 via one or more communicative devices (e.g., a modem, wireless router, cellular device, or other communicative device). In some embodiments, the dimensions module 206 may store information locally, remotely, or both. The dimensions module 206 may store one or more site plans or work plans which may include data associated with a gradient or other surface characteristic of the job location 10.

Figure 4:
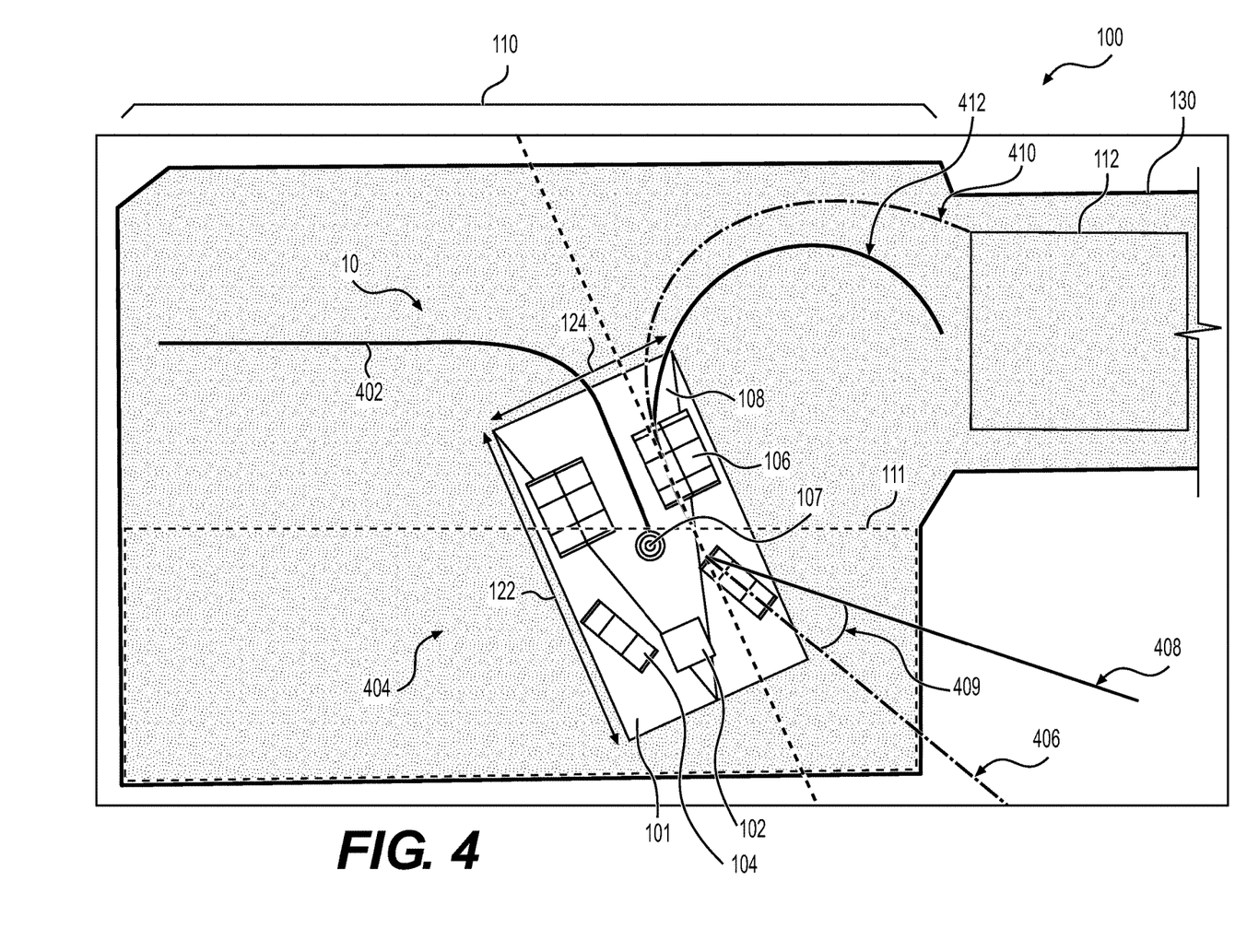
FIG. 4 is a second top view of the plan for automatically steering the AMT of FIG. 1.
Figure 5:
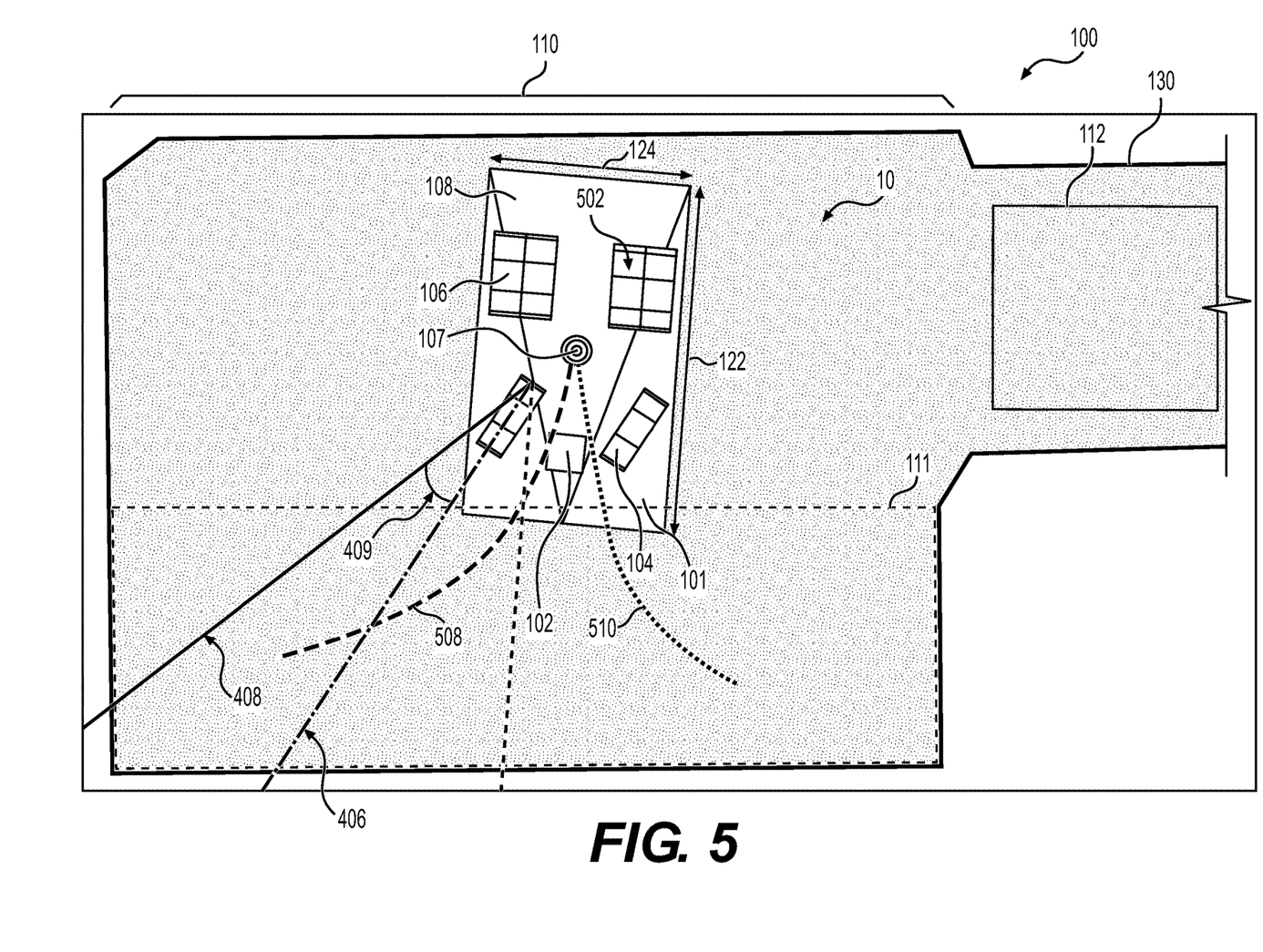
FIG. 5 is a third top view of the plan for automatically steering the AMT of FIG. 1.
Figure 6:
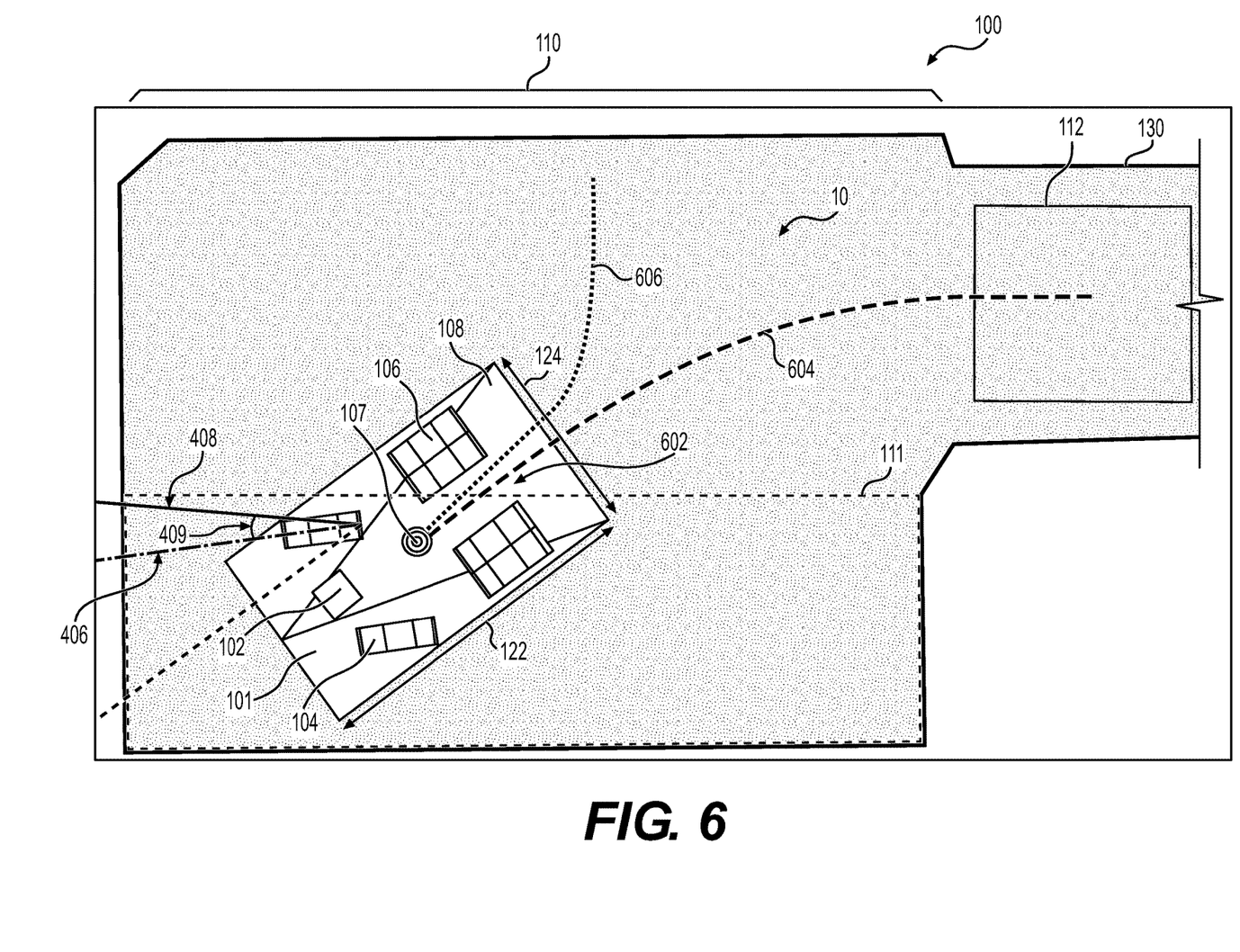
FIG. 6 is a fourth top view of the plan for automatically steering the AMT of FIG. 1.

The scoot steering module 208 may receive inputs from a steering angle sensor 209 and a desired steering angle (e.g., as calculated by the dimensions module 206) and save and/or use data associated with these inputs to automatically scoot steer the AMT 101 as described in greater detail herein, especially with respect to FIGS. 4-6. The steering angle sensor 209 may be, for example, a hydraulic cylinder sensor or other sensor associated with a hydraulic steering system. In some embodiments, the steering angle sensor 209 is a combination of various sensors (e.g., a virtual sensor with one or more IMUs) and may receive an input from one or more GPS systems. The desired steering angle may be a calculated or derived value for a desired turning radius, which value may be necessary in order to complete a turn to put the AMT 101 into a desired position within the job location 10 (e.g., the target area 112) in a useful orientation (e.g., with a bed of the AMT 101 ready to receive mining material or constituent).

The steering while stopped module 210 may receive inputs from one or more features configured to measure a speed of the AMT 101, such as the speed sensor 211. The speed sensor 211 may be, for example, a wheel speed sensor, a transmission output speed sensor, or a combination of sensors capable of determining a machine speed. The steering while stopped module may further determine one or more of a pitch, roll, or yaw of the AMT 101 using, for example, the GPS 213 and/or the IMU 215. The speed sensor 211 may be configured to measure, for example, a speed of one or more of the front wheels 104 and the rear wheels 106 of FIG. 1. The vehicle speed and/or pitch, roll, yaw as measured from these inputs may be used as inputs for the system 100 to determine whether or not to release the front brakes while the AMT 101 stays stationary in order to steer the front wheels 104 while the AMT 101 remains stopped with the rear brakes engaged. That is, if the AMT 101 is stopped and oriented such that it will not begin to move with the front brakes released and the rear brakes engaged, the AMT 101 may release the front brakes to steer the front wheels 104 in order to affect its minimum turn radius as described in greater detail herein, especially with respect to FIGS. 4-6.

Still referring to FIG. 2, steering command 212 and the drive/brake command 214 may automatically steer and propel the AMT 101 throughout the job location 10 by sending commands to one or more of a hydraulic, electrical, or mechanical steering, braking, and drive system. The steering system may be, for example, an electric power steering system including, for example, a steering wheel, steering column, torsion bar, reduction gears mechanism, power steering motor, gear and rack, etc. The steering system may further include, for example, a steering wheel torque sensor, wheel speed sensors, one or more electronic control units, etc. The steering command may be, for example, a signal that causes a torque to be applied to the steering wheel or other mechanism. Similarly, the drive/brake command 214 may send a signal to control one or more components of the drive train and brake system of the AMT 101 (for example, an engine, a transmission, a drive shaft, one or more axles, one or more primary or auxiliary brake systems, etc.) to autonomously drive the AMT 101.

INDUSTRIAL APPLICABILITY

Figure 3:
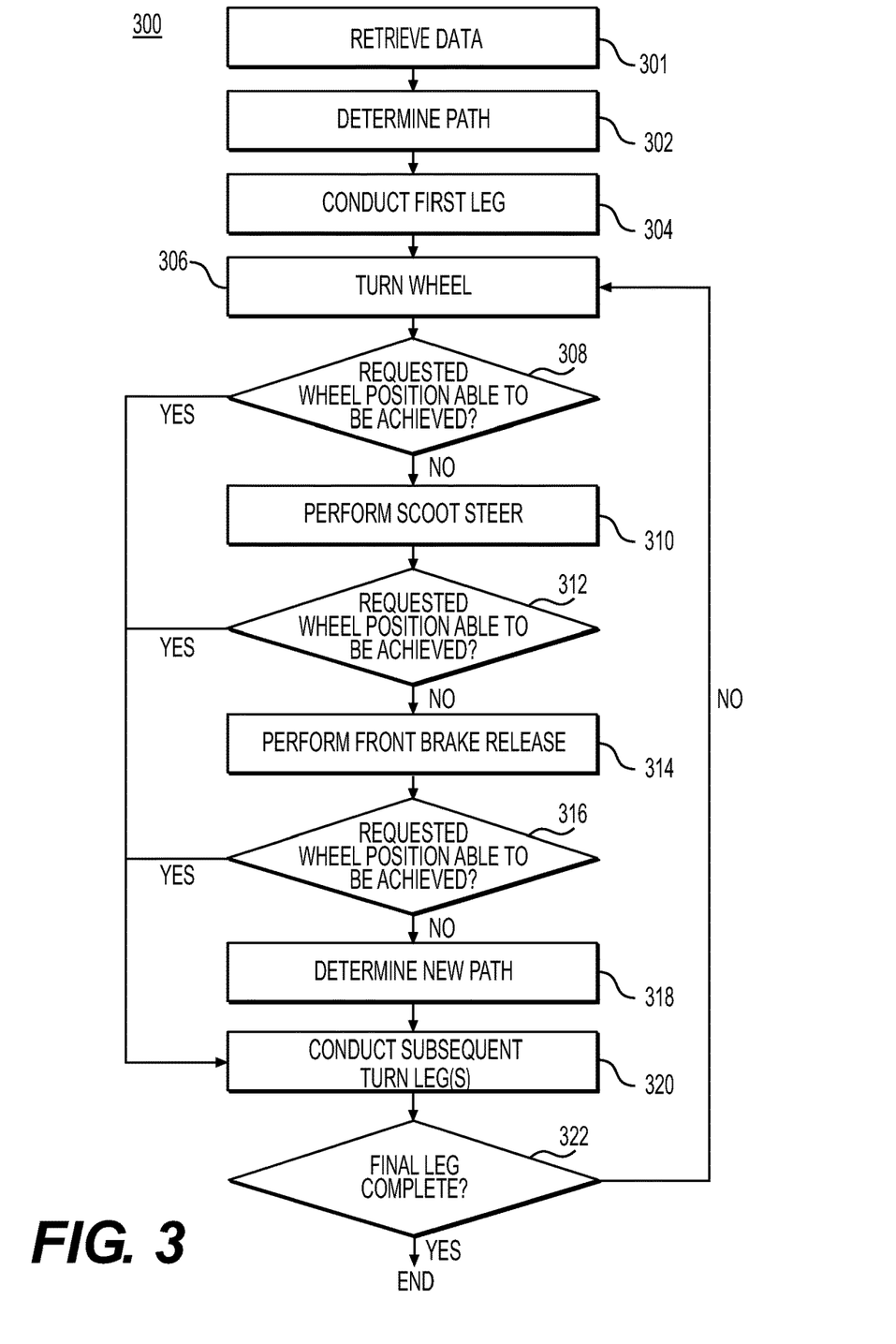
FIG. 3 provides a flowchart depicting an exemplary method for automatically steering the AMT of FIG. 1.

Referring now to FIG. 3, a flowchart depicts a process 300 for maneuvering an AMT around an operating area of a work site, such as the job location 10. The process 300 depicted is a non-limiting exemplary method including multiple steps, but persons of skill will recognize that variations to the process 300 are possible according to the aspects of the automatic vehicle steering described herein. The disclosed aspects of the system 100 of the present disclosure may be used to turn the AMT 101 to better position it for work within the confines of a narrow area, such as a mine. Referring now to FIGS. 3 and 1, 4, 5, and 6, the process 300 for steering the AMT 101 using the system 100 is described in greater detail.

FIG. 1 shows the AMT 101 entering the operating area 110. The operating area 110 may be adjacent to the target area 112 and the features and aspects (e.g., shape, length, width, height, ground characteristics, etc.) of the operating area 110 and the target area 112 may be input to the system 100 by an operator or automatically, for example from a survey of the operating area 110 using a drone. The AMT 101 may enter the operating area 110 for any number of reasons, but in the particular scenario depicted, the AMT 101 enters the operating area 110 in order to turn 180 degrees and place the bed 108 of the AMT 101 within the target area 112 such that the bed 108 can be loaded with minerals while in the target area 112.

The AMT 101, which will turn 180 degrees in the operating area 110, would ideally turn in one single turn (i.e., a u-turn). However, the space within the operating area 110 may be insufficient for a u-turn and a different type of turn may be required. When space is sufficient, a vehicle could attempt a two-segment (or "two-leg") turn to turn 180 degrees. That is, a single turn to the right or left while the vehicle moves forward, followed by a stop, and then a single reverse with the steering mechanism in the opposite direction, until the vehicle is facing the equal and opposite direction as before it began the turn (i.e., substantially 180-degrees). Sufficiency of the space will depend on a number of factors including the geometry and surface characteristics of the operating area 110 and the geometry (i.e., length, width) and turn characteristics (e.g., turn radius) of the AMT 101 itself. Boundary data, which may be associated with the operating area and may include information such as, for example, the geometry of the operating area 110, the target area 112, the cusp 111, and other features of the worksite may be represented digitally in a mapping program of the AMT 101 with one or more lane polygons or other digital features, which may be retrieved at the AMT 101 at step 301 of FIG. 3. The boundary data including the lane polygons may be received, for example, from an external source via an external connection and may be stored in one or more modules of the controller 102 (e.g., the memory).

In the exemplary operating area 110 depicted in FIG. 1, a two-leg turn (i.e., one forward turn to the right and one reverse turn into the target area 112) may not be possible for the AMT 101 in the operating area 110. However, the AMT 101 may not determine that a two-leg turn is not possible until it is actually in the operating area 110. For example, in some scenarios, the AMT 101 may deploy to the operating area 110 with plans for making a two-segment turn, and then once in the operating area 110, the AMT 101 may determine that a two-segment turn is not possible based on one or more factors. For example, the AMT 101 may experience greater than anticipated friction making it difficult to affect steering mechanisms to steer the front wheels 104. Hence, the onboard steering system may need to recalculate the turn maneuver to increase the number of turn legs necessary to automatically steer the AMT 101 through the multiple segment turn.

Based on the lane polygons, the system 100 may determine the path to follow to execute a turn maneuver within the one or more lane polygons based on the dimensions of the lane polygons and the dimensions of the AMT 101 at step 302. As mentioned the determined path may include one or more turn legs (or segments) and the AMT 101 may determine a number of legs necessary to follow the path through the turn maneuver. The number of legs may be based on the geometry and other characteristics of the operating area 110 and the geometry of the AMT 101 and its operating characteristics. For example, the determined number of legs may be based on specifications of the AMT 101 (e.g., turn radius, size, wheel base, wheel structure and composition which may affect the friction of the wheel on the surface of the operating area 110, etc.) and specifications of the area where the work is being completed. For example, if the ground at the operating area 110 makes steering the wheels of the AMT 101 difficult, more turns may be required. Similarly, if the area in which the AMT 101 will make its turn is particularly small or narrow, more turn legs may be required for a single turn maneuver.

Once the path to follow is calculated at step 302, the AMT 101 may begin to execute the maneuver and may begin a first leg of the turn maneuver at step 304. For example, with reference to FIGS. 1 and 4, the AMT 101 may turn to the right as shown by turn leg 402. FIG. 4 shows the AMT 101 stopped at the end of the first leg of the turn maneuver. The AMT 101 may determine its position within the operating area 110 based on the sensor(s) 107 (e.g., GPS, IMU, etc.) At the end of the turn leg 402, the AMT 101 has entered the cusp 111. The AMT 101 may begin to turn its front wheels 104 in the opposite direction to complete a second, reverse leg of the turn maneuver at step 306.

Under ideal conditions, the front wheels 104 may be capable of turning from a centerline to a maximum capable wheel position 408. The maximum capable wheel position 408 may be a degree of turn of the front wheels 104 which may minimize the turn radius of the AMT 101. With the front wheels 104 turned to the maximum capable wheel position 408, the AMT 101 may reverse from the position shown in FIG. 4 along a minimum reverse turn radius 412. In the hypothetical scenario depicted in FIG. 4, if the front wheels 104 could turn to the maximum capable wheel position 408, the AMT 101 could reverse into the area 112 and complete its mission with only two turn legs required. However, the AMT 101 is only capable of turning its wheel to the first front wheel position 406, which is less than a maximum capable wheel position 408 by a turn position difference 409. With the wheels at the first front wheel position 406, the AMT 101 will only be capable of reversing along an actual reverse turn radius 410, which would not put the AMT 101 into the target area 112 and would not enable the AMT 101 to complete its mission (e.g., position the bed 108 into the target area 112). Hence, the AMT 101 must increase the degree of turn of its front wheels 104 to a sufficient degree of turn to reach the target area 112 before performing the subsequent reverse leg of the turn maneuver or plan more turn legs into the turn maneuver.

At step 308, the AMT 101 may determine whether the requested wheel position (that is, the wheel position necessary to complete the segment of the turn maneuver) is achievable. In some embodiments, the system 100 may have calculated that the AMT 101 needs to turn its wheels to the maximum possible degree in order to reach the target area 112 and the AMT 101 may thus attempt to adjust its front wheels 104 to achieve the tightest turn capable. If the AMT 101 is able to achieve the wheel position necessary to follow the previously-planned path (e.g., reverse into the target area 112 in the next turn maneuver), it may move on to step 320 and conduct the reverse turn. However, the wheels may be incapable of turning to their maximum capable turned position based on various factors such as surface characteristics or geometry of the operating area (e.g., slope, etc.). That is, it may be difficult for the wheels to turn to their maximum capable turned position if, for example, the friction force acting against the turning of the wheel is greater than the forces (e.g., hydraulic pressure) causing the wheels to turn. In some scenarios, there may be more weight on the front tires due to load and/or the grade (i.e., slope) of the road. In such scenarios, there may be a greater normal force between the tire(s) and ground and therefore greater friction, which may make it more difficult for a steering mechanism (e.g., a steering actuator) to turn the wheels. Additionally, if steering commands have been executed recently, some components of the steering system may not be capable of turning the wheels to a given turn degree under a given load. For example, a steering accumulator may not have sufficient energy to supply a required force to turn the wheels if another turn was recently completed. Additionally, some steering systems may not have constant mechanical advantage during the turn, meaning at certain steering angles, more force or torque may be required to change the steering angle. If the AMT 101 cannot achieve the sufficient turn angle with the front wheels 104, it may take one or more remedial actions in order to make a tighter turn.

For example, the AMT 101 may attempt a scoot steering maneuver to decrease its turn radius at step 310. A scoot steering maneuver may include moving in forward or reverse for a given distance while commanding steering in order to increase the degree of turn of the front wheels 104. The scoot steering module 208 may receive, for instance a steering angle sensor signal 209 and a speed signal 211 (e.g., based on a wheel speed) and based on these signals may generate a steering command 212 and/or a drive/brake command 214. The AMT 101 may drive a maximum time and/or distance before it stops in order to avoid collision or leaving a lane polygon. For example, the AMT 101 may travel for 3.5 seconds or a maximum of 3 meters. While the AMT 101 moves it may attempt to steer and if the desired steering angle has not been achieved during this maneuver, the AMT 101 may continue to attempt to steer while it is stopped for a given period of time. For instance, the AMT 101 may attempt to command steering to reach the desired turn angle for up to 10 seconds but may stop attempting to command steering based on a failure to achieve the desired turn angle.

After performing the scoot steering maneuver the AMT 101 may again determine whether it is capable of achieving the requested wheel position. If so, it may conduct subsequent turn maneuvers at step 320. However, if the AMT 101 is not successful at achieving the desired turn angle using the scoot steering maneuver, the AMT 101 may attempt to release the front brakes of the front wheels 104 in order to decrease the turning radius at step 314. The brakes of the front wheels 104 may be a secondary brake system (i.e., the AMT 101 may have another primary brake system that keeps it from moving) and may affect the ability of the front wheels 104 to turn such that releasing the brakes may increase the turn angle of the front wheels 104. However, it may be undesirable to release the front brakes if, for example, the AMT 101 is on an incline such that it may roll or move forward or in reverse with the front brakes released or if, for example, another system of the AMT 101 is specifically requesting the front brakes to be engaged. The incline (or pitch angle) of the AMT 101 may be determined, for example, using the IMU 215. Whether the AMT 101 is moving or moves forward with the front brakes released may be determined, for example, with the speed sensor 211 (which may measure, for example, a wheel speed). Whether the secondary brakes are requested by another system of the AMT 101 may be determined based on a brake system status.

If all of the requirements for releasing the front brakes are met, the AMT 101 may release the front brakes and attempt to increase the degree of turn of the front wheels 104 to try and achieve a turn radius that would enable the AMT 101 to enter the target area 112 in the subsequent reverse turn. If the AMT 101 is unable to meet the necessary turn angle to follow the previously-determined path (e.g., to enter the target area 112 on the subsequent reverse turn), the AMT 101 may calculate a new, second path including a new number of turn legs and/or different turn radii in order to reach the target area 112 at step 318 (e.g., add additional segments to the turn path) based on an inability to reach the target area 112 using the first path. Based on the new number of turns necessary to reach the target area, the AMT 101 may proceed to determine whether the required wheel positions for the newly calculated turns can be achieved as discussed above and if so, may continue to perform the subsequent reverse and forward turns of the turn maneuver at step 320.

If the AMT calculates a new, second path at step 318, it may proceed to conduct the subsequent turn legs as mentioned and it may continue to perform subsequent turn legs and between each leg it may proceed through the various applicable steps of the process 300 until it is able to reach the target area 112. In some embodiments, the AMT 101 may need to calculate new third, fourth, fifth, etc. paths in order to reach the final leg of the turn. For example, in locations where the lane boundaries are particularly tight, it is difficult to turn the wheels of the AMT 101, or for various other reasons. Upon reaching the target area 112, the AMT 101 may perform a check to determine whether it is in the target area 112 (e.g., using on board sensors (e.g., GPS, IMU, LiDAR, camera, or other information) at which point it may determine that the final leg is complete at step 322.

FIG. 5 shows the AMT 101 at a position 502 having performed the initial reverse turn from the position 404 in FIG. 4 after following the turn leg 510 with a new planned turn leg 508. FIG. 6 shows the AMT 101 having performed a subsequent forward turn to the right along the turn leg 606 with a planned reverse turn into the target area 112 as described at step 322. Once the AMT 101 has completed the final leg of the turn maneuver, it may end its process, as previously mentioned. However, if the AMT 101 has not completed the final turn of the maneuver, it may determine whether it is able to achieve a requested wheel position after each leg of the turn maneuver as shown in FIG. 3. If so, it may continue through the steps until it is able to reach its final leg and complete the final leg. After the AMT 101 backs into the target area 112, it will have performed a four-segment turn to reach the target area 112. If multiple subsequent reverse turns and multiple subsequent forward turns are necessary (e.g., in six-, eight-leg turns), the AMT 101 may continue to conduct the subsequent turns as necessary until it performs the final reverse turn into the target area 112 with the bed 108 of the AMT 101 aligned to receive constituent at step 320. The AMT 101 depicted in FIG. 6 at the spot 602 is ready to perform the final reverse turn into the target area 112.

It should now be understood that current systems and methods for articulating wheels may be insufficient to turn autonomous vehicles in spaces limited by the dimensions of the vehicle operating therein as compared to the dimensions of the space. The systems and processes described herein provide autonomous vehicles the capabilities to resolve such insufficiencies by increasing turn radii to reduce the number of maneuvers necessary in limited spaces, thus increasing autonomous vehicle capabilities. More capable autonomous vehicles can require less or no human interaction or involvement in heavy equipment operations, reducing costs and increasing efficiencies at work sites.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method of automatically turning an autonomous mining truck (AMT), including front wheels and rear wheels, around in an operating area, comprising:
    retrieving boundary data associated with the operating area, wherein the operating area is a mine;
    determining a first path to follow to execute a turn maneuver within the operating area based at least on the boundary data and dimensions of the AMT, wherein the first path includes two or more first legs necessary to follow the first path through the turn maneuver;
    completing one first leg of the turn maneuver;
    determining a second path to follow and a number of second legs necessary to execute the turn maneuver based on an inability to execute the first path, wherein the inability to execute the first path is due to surface characteristics of the operating area and a loading of the AMT that affect a steering ability of one or more wheels of the front wheels or the rear wheels; and
    executing the second path to complete the turn maneuver, wherein the number of second legs is greater than the number of first legs,
    wherein the determining the second path includes adding one or more subsequent legs to the first path, and wherein one or more of the subsequent legs of the turn maneuver is performed at a calculated minimum turn radius of the AMT.

2. The method of claim 1, wherein achieving the calculated minimum turn radius includes releasing a secondary brake system.

3. The method of claim 2, wherein the secondary brake system is released based on an input from a wheel speed sensor.

4. The method of claim 2, wherein the secondary brake system is released based on a pitch angle of the AMT.

5. The method of claim 2, wherein the secondary brake system is released based on a secondary brake system status.

6. The method of claim 1, wherein achieving the calculated minimum turn radius of the AMT includes moving forward to reduce friction on one or more wheels of the front wheels or the rear wheels of the AMT.

7. The method of claim 1, wherein if the calculated minimum turn radius is not achieved, the AMT steers while stopped for up to 10 seconds.

8. A method of preparing to execute a task within an operating area using an autonomous mining truck (AMT), including front wheels and rear wheels, comprising:
    retrieving boundary data associated with an operating area, wherein the operating area is a mine;
    determining a path to follow to execute a turn maneuver within the operating area based at least on the boundary data and dimensions of the AMT, wherein the path includes two or more legs necessary to follow the path through the turn maneuver;
    completing a leg of the turn maneuver;
    determining that a requested wheel position is unable to be achieved due to (1) surface characteristics and an increase in surface friction due to loading of the AMT or (2) a slope of the operating area;
    moving in one or more of a forward direction and a reverse direction while commanding steering to the requested wheel position to assist in reaching the requested wheel position; and
    initiating a subsequent leg of the turn maneuver based on achieving the requested wheel position, wherein the subsequent leg of the turn maneuver is performed at a calculated minimum turn radius of the AMT.

9. The method of claim 8, wherein achieving the calculated minimum turn radius includes releasing a secondary brake system.

10. The method of claim 9, wherein the secondary brake system is released based on an input from a wheel speed sensor.

11. The method of claim 9, wherein the secondary brake system is released based on a pitch angle of the AMT.

12. The method of claim 9, wherein the secondary brake system is released based on a secondary brake system status.

13. A system for automatically turning an autonomous mining truck (AMT) around in an operating area within a mine, the system comprising:
    one or more front wheels;
    one or more rear wheels; and
    a controller, including machine readable instructions, that when executed by the controller cause the AMT to:
        retrieve boundary data associated with the operating area;
        determine a first path to follow to execute a turn maneuver within the operating area based at least on the boundary data and dimensions of the AMT, wherein the first path includes two or more legs necessary to follow the first path through the turn maneuver;
        complete a first leg of the turn maneuver;
        determine a second path to follow and two or more legs necessary to execute the turn maneuver based on an inability to execute the first path due to the one or more front wheels or the one or more rear wheels being unable to meet a necessary turn angle to follow the legs of the first path, wherein the one or more front wheels or the one or more rear wheels being unable to meet the necessary turn angle to follow the legs of the first path is due at least in part to a greater than anticipated friction due to loading of the AMT; and execute the second path to complete the turn maneuver, wherein the determining the second path includes adding one or more subsequent legs to the first path, and wherein one or more of the subsequent legs of the turn maneuver is performed at a calculated minimum turn radius of the AMT.

* * * * *